(12) United States Patent
Deng et al.

(10) Patent No.: US 7,106,564 B2
(45) Date of Patent: Sep. 12, 2006

(54) DEVICES AND METHODS FOR DETECTING ISLANDING OPERATION OF A STATIC POWER SOURCE

(75) Inventors: Duo Deng, Canton, MI (US); Anil Tuladhar, Dearborn Heights, MI (US)

(73) Assignee: Ballard Power Systems Corporation, Dearborn, MI (US)

( * ) Notice: Subject to any disclaimer, the term of this patent is extended or adjusted under 35 U.S.C. 154(b) by 352 days.

(21) Appl. No.: 10/328,934

(22) Filed: Dec. 23, 2002

(65) Prior Publication Data

US 2003/0147191 A1    Aug. 7, 2003

Related U.S. Application Data

(60) Provisional application No. 60/319,077, filed on Jan. 16, 2002.

(51) Int. Cl.
*H01H 47/32* (2006.01)
(52) U.S. Cl. .......................... 361/62; 361/187
(58) Field of Classification Search .......... 361/62–69, 361/185–187; 307/43, 45, 87; 322/20, 29, 322/44; 363/118–120, 148, 149
See application file for complete search history.

(56) References Cited

U.S. PATENT DOCUMENTS

| | | | | |
|---|---|---|---|---|
| 4,878,208 A * | 10/1989 | Seki et al. | ...................... | 368/87 |
| 5,111,377 A * | 5/1992 | Higasa et al. | .................. | 363/95 |
| 5,162,964 A | 11/1992 | Higasa et al. | .................. | 361/20 |
| 5,493,485 A | 2/1996 | Okado | ........................... | 363/56 |
| 5,686,766 A | 11/1997 | Tamechika | .................... | 307/43 |
| 5,808,449 A | 9/1998 | Hirayama et al. | ............. | 322/20 |
| 6,107,784 A | 8/2000 | Nomiya et al. | ............. | 323/205 |
| 6,172,889 B1 | 1/2001 | Eguchi et al. | ................. | 363/95 |
| 6,188,145 B1 | 2/2001 | Stewart | ...................... | 307/125 |
| 6,219,623 B1 * | 4/2001 | Wills | ............................ | 702/60 |
| 6,362,988 B1 * | 3/2002 | Deng et al. | .................. | 363/148 |
| 6,429,546 B1 * | 8/2002 | Ropp et al. | .................... | 307/31 |
| 6,815,932 B1 * | 11/2004 | Wall | ............................. | 322/20 |

OTHER PUBLICATIONS

Anil Tuladhar, U.S. Appl. No. 10/345,871, filed Jan. 15, 2003, entitled "Anti-Islanding Device and Method for Grid Connected Inverters Using Random Noise Injection.".

* cited by examiner

*Primary Examiner*—Brian Sircus
*Assistant Examiner*—Danny Nguyen
(74) *Attorney, Agent, or Firm*—Seed IP Law Group PLLC

(57) ABSTRACT

Devices and methods for detecting islanding operation of a static power source involve injection of a non-harmonic error on the phase angle of the static power source in regular steps to introduce a very small intentional phase shift for the output voltage of the static power source in every voltage cycle which is corrected in each cycle in synchronization with the grid voltage in normal operation of the grid. In abnormal operation of a grid loss, this intentional small phase shift or error causes an intentional small frequency drift in each voltage cycle that continues in one cycle after another cycle. When the intentional frequency drift is over a preset level, a detection circuit starts to isolate the static power source from the grid to prevent islanding operation.

24 Claims, 6 Drawing Sheets

DEVICES AND METHODS FOR DETECTING ISLANDING OPERATION OF A STATIC POWER SOURCE

BACKGROUND OF INVENTION

1. Field of the Invention

The present invention relates generally to the field of electric power, and more particularly to devices and methods for detecting the islanding operation of a static power source connected to a utility grid.

2. Description of the Related Art

FIG. 1 is a block diagram that shows an example of a static power source (SPC) 10 connected to and in parallel operation with a grid 12 when a breaker Brk 1 is closed. The electrical loads LD1 and LD2, shown hanging at local power lines 14, can obtain power from both the SPC and/or the grid when the breaker Brk 1 is closed. However, when the grid voltage $V_{a\text{-}g}$, $V_{b\text{-}g}$, $V_{c\text{-}g}$ is lost, for example, by opening the breaker Brk 1, the loads LD1 and LD2 can still obtain electrical power $V_{a\text{-}spc}$, $V_{b\text{-}spc}$, $V_{c\text{-}spc}$ from the SPC 10 through the local power lines 14. That situation, in which the operation of a local power source, such as the SPC 10 in FIG. 1, continues to power the local power lines and load after the grid voltage $V_{a\text{-}g}$, $V_{b\text{-}g}$, $V_{c\text{-}g}$ is disconnected is called islanding operation.

Islanding operation is not desirable due to safety concerns. Detecting the islanding operation of a local power source, such as SPC 10, and isolating the local power source from the local power lines 14 after the grid 12 is lost is typically made mandatory by regulation. It is mandatory to have an anti-islanding feature on inverters, or utilities will not allow such inverters to be connected to the utility grid. In addition to safety issues, islanding also has performance implications. Current active methods of addressing the islanding problem include injecting harmonics which compromise performance. There are also passive methods which have non-detection zones, so anti-islanding is not guaranteed for all conditions. There is a separate issue of multi-unit operations, which also poses a problem for harmonic injection because harmonics can cancel each other.

Existing methods use harmonics or frequency pulse injection, or an explicit positive voltage or frequency feedback technique to detect the grid loss. These methods have serious drawbacks. Such injected signals can interfere with the grid or the load. The injected signals can sometimes cause resonance. The injected signals can also cancel each other, rendering the technique useless when two or more SPCs are connected together. The harmonics introduced to the grid affects the grid quality. The explicit frequency or voltage drifting technique is based on grid frequency/voltage change, and a positive feedback is used to drift the frequency/voltage away. This method cannot guarantee that islanding can be detected if there are no voltage or frequency changes when islanding occurs. At a special operation point (i.e., ideal islanding condition), the SPC's output power and power factor match the load's power and power factor on the local grid, thus there will be no frequency and voltage changes when islanding occurs, causing the above described explicit frequency or voltage drifting technique to fail.

Not only may there be a non-detection point (NDP) as it is described in the above ideal islanding condition, there may also be a non-detection zone (NDZ) associated with the above described method. When the SPC's power and power factor are very close to the load's power and power factor, the frequency and voltage change will be very small when islanding occurs. In order to detect these small changes and build up the drift, a larger gain will have to be used for the positive feedback of the explicit frequency or voltage drifting technique. However, a larger gain for positive feedback can cause the system to become unstable, while a smaller gain can potentially make the system have a larger NDZ in detecting islanding.

BRIEF SUMMARY OF INVENTION

In one aspect, a device and method detect the islanding operation of a static power source (SPC) without causing an NDP or NDZ.

In another aspect, a device and method for detecting the islanding operation of an SPC is not sensitive to load conditions.

In still another aspect, a device and method are disclosed for detecting the islanding operation of an SPC without causing frequency shift, power factor change and extra harmonics at normal operating conditions of the SPC.

In yet another aspect, a device and method are disclosed for detecting the islanding operation of an SPC in which an error frequency amplifier (EFA) with positive feedback gain is used only when islanding occurs, so the stability of the system is guaranteed as long as the grid is present.

In a further aspect, a device and method are disclosed for detecting the islanding operation of an SPC utilizing a "software" based solution for a microprocessor based SPC with grid parallel operation ability that does not require extra hardware.

In yet a further aspect, a device and method are disclosed for detecting the islanding operation of an SPC that can be adapted for a multisystem.

An embodiment of the present invention provides a device and method for detecting the islanding operation of an SPC, such as an inverter, connected to a grid. The device and method introduces, for example, a very small phase angle error for an output voltage of the SPC in every voltage cycle. This small phase angle error can be a positive, negative or random value. This method involves injecting a phase angle error at each of a predetermined number of control step intervals in each voltage cycle of the SPC. As an example, a very small phase angle error (e.g., 0.002°) is injected in every control step (e.g., 100 µs step). Because the injection phase angle is very small, the accumulation of the phase angle error in each voltage cycle can be controlled to be very small, in the range of less than plus or minus one degree.

The accumulated small phase angle error is corrected at each voltage cycle in synchronization with a voltage of the grid, if the grid is present. If the grid is lost, the small phase angle error existing in the SPC will not be corrected by the grid voltage, causing an initial frequency change. The initial frequency change will cause more frequency change, because the injected phase angle error exists. By properly selecting the magnitude of the small phase angle error, this initial frequency change can be controlled to have sufficient magnitude and is used to overcome the NDP or NDZ of the SPC. The initial frequency change can be accumulated, and frequency drift will occur, from cycle to cycle. The amount of initial frequency drift is used as an indication of "possible" grid loss and an "on" flag is set to enable the function block of an error frequency amplifier (EFA) with positive feedback again.

The EFA with positive feedback gain may be used to create fast frequency drift when islanding occurs to enhance the desired performance of islanding detection and protection circuit and method. The EFA is placed in "off" or "on"

states depending on the existing grid condition. When the grid is present, the EFA is controlled "off", so that the drawbacks of the method of frequency drift with positive feedback at normal operation are eliminated. When the grid is lost, the EFA is controlled "on", so that the frequency drift speed can be accelerated. An indication of possible loss of the grid is used as the "on" signal for the EFA. For example, frequency change rate can be used as the indication of possible loss of the grid. When the frequency change rate is over a preset level, a flag will be set and "on" enabling the EFA.

Additional novel features, advantages and objects will be set forth in part in the description which follows, and in part will become more apparent to those skilled in the art upon examination of the following, or may be learned by practice of the invention.

DETAILED DESCRIPTION OF THE INVENTION

Figure 1:
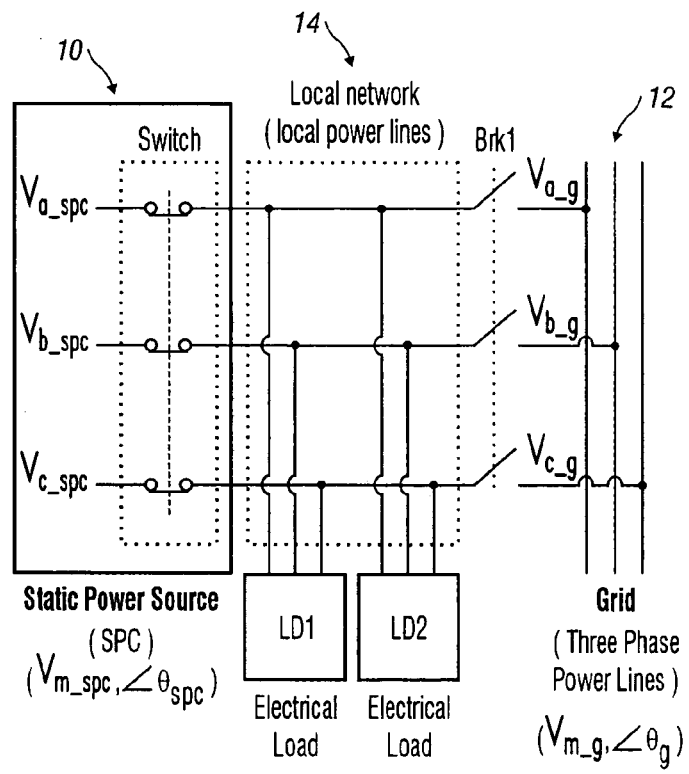
FIG. 1 is a block diagram that shows an example of a static power source (SPC) connected to and in parallel operation with a grid when a breaker Brk 1 is closed.

Referring now in detail to an embodiment of the present devices and methods, an example of which is illustrated in the accompanying drawings, in which like numerals designate like components, the present devices and methods provide a very reliable method of detecting islanding operation of a static power source (SPC) 10, as shown in FIG. 1, connected to a grid 12 utilizing phase angle error injection. In the normal operation of the existing grid 12, an embodiment of the present devices and methods introduces a very small phase angle error for output voltage of the SPC 10 in every voltage cycle. However, the average frequency of the SPC 10 is not influenced by the phase error, and there is no frequency drift from the output voltage of the SPC 10 because the accumulated small phase angle error is corrected at each voltage cycle in synchronization with a voltage of the grid 12, if the grid 12 is present.

Figure 5:
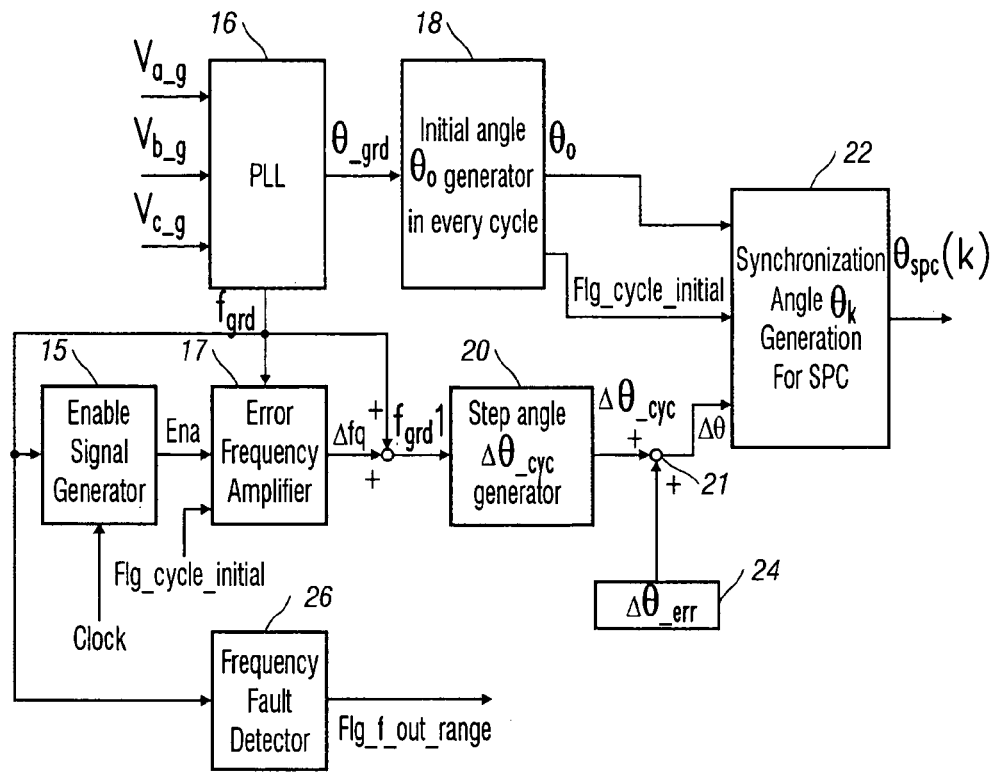
FIG. 5 is a block diagram that shows an example of components and the flow of information between the components for the error frequency amplifier (EFA) for frequency drift acceleration at islanding operation of an embodiment of present devices and methods.

In abnormal operation of a grid 12 loss, this intentional small phase error causes an initial small frequency error from the original grid frequency. This frequency error continues and forms a frequency drift when there is no grid correction. When the frequency drift rate is over a preset level, for example 0.1 Hz in 3 cycles or 2 Hz/second, a detection circuit starts to set a grid 12 loss flag and to enable an error frequency amplifier (EFA) 17 functionality, as shown in FIG. 5. If the grid 12 is lost the EFA 17 will make the frequency of the SPC 10 drift faster. When the operation frequency of the SPC 10 is over a preset range (e.g., 59 Hz to 60.6 HZ) a detection circuit starts to isolate the SPC 10 from the grid 12 to prevent islanding operation. Simulation has proven that this method can detect an islanding status of the SPC 10 without introducing any extra harmonics or causing any stability issue as explicit positive feedback does.

An aspect of the present devices and methods involves injection of an error on the phase angle in regular steps. The error is so small that it will not cause any extra harmonic effect for the SPC 10. In every cycle a certain phase angle error is injected, and the angle error is also corrected at every cycle. For example, every 100 or 200 microseconds, a small error phase angle is injected. The injected small error in the phase angle can be positive, negative or a random value. The angle error that accumulates over a 360 degree cycle is only on the order of −1 degree or +1 degree. After each cycle, the error is corrected, depending on the voltage from the grid 12. In that way, the error does not simply go from one cycle to another cycle, and it does not cause performance or power factor problems or any significant harmonics of the system. It does introduce small step changes in the frequency when the grid 12 is lost, which helps in detecting a disconnection of the grid 12 as soon as it occurs by a small step change in the frequency that is seen.

Thus, the small phase angle error in every cycle is achieved by introducing a tiny phase angle error in every control step, so that the balanced operation between the SPC 10 and the load can be broken at an ideal islanding condition. This method overcomes NDP and NDZ issues without deteriorating the performance of the SPC 10 that exist in many previous islanding detection methods. There is no error of the output frequency of the SPC 10 when the grid 12 is present, because of continuous correcting and synchronization with the grid 12. However, if the grid 12 is disconnected, there is no force to correct it, so the frequency will begin drifting naturally. If a positive error is being introduced in the angle, and the angle is increasing, the frequency will start decreasing. The frequency is the change rate of the angle, so if the angle is increasing and positive error is introduced, the frequency will begin decreasing. When the grid 12 is disconnected, there is no grid 12 to force the frequency back, for example, to 60 Hz. The initial frequency drift is always created when islanding occurs.

In a multi-unit mode, all of the inverter units made by a particular manufacturer can be made with the same directional characteristics. In that way, the inverters comprising the SPC 10 in which they are used will be synchronized, and there will not be a problem of canceling each other's effects.

Figure 2:
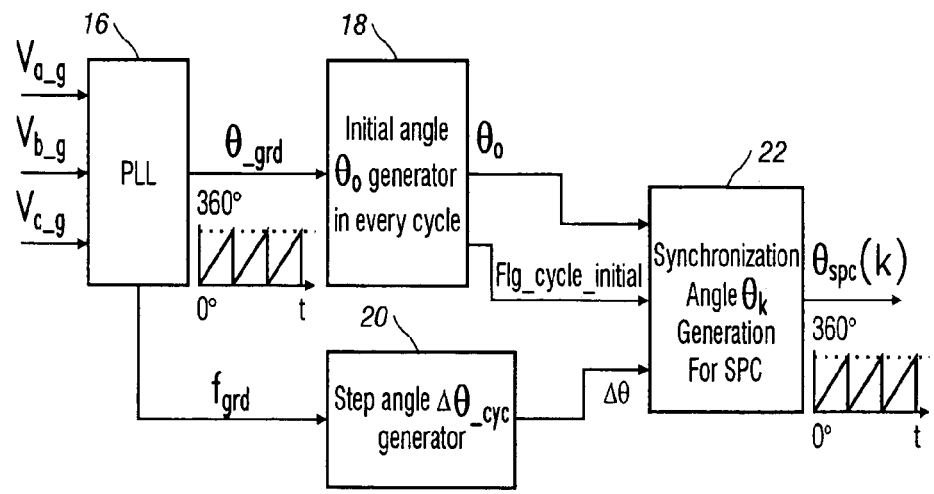
FIG. 2 is a block diagram which illustrates an example of components and the flow of information between components for a process of the synchronization phase angle generation using a phase lock loop (PLL) controller that can optionally be used in implementation of one embodiment of the present devices and methods.

FIG. 2 is a block diagram that illustrates an example of components and the flow of information between components for a process of the synchronization phase angle generation using a phase lock loop (PLL) 16 controller that can optionally be used in implementation of the device and method for an embodiment of the present invention. The synchronization phase angle generation process shown in FIG. 2 is useful in implementation of an embodiment of the present invention, but is not a necessary feature of the present invention.

Figure 3:
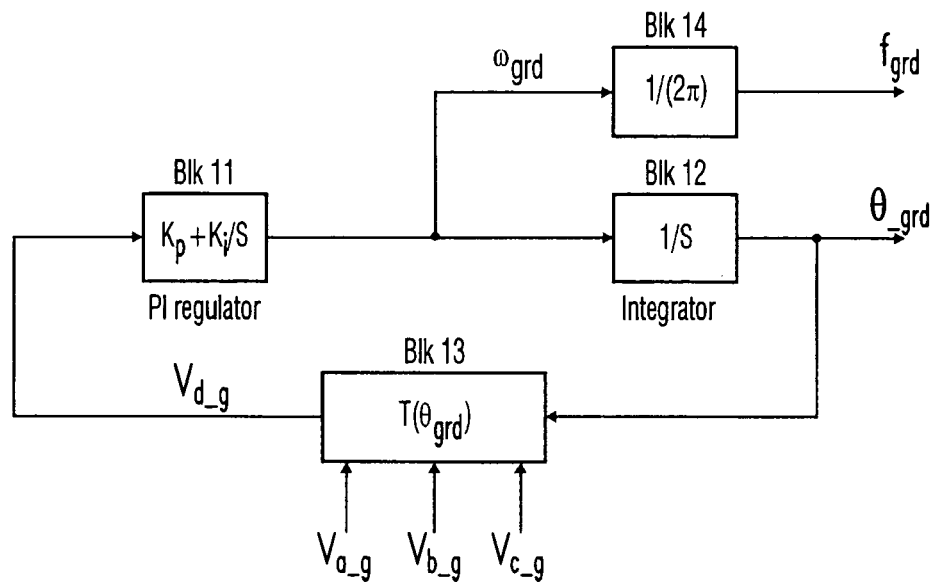
FIG. 3 is a block diagram that shows an example of components and the flow of information between components of the (PLL) controller of FIG. 2 that is useful in obtaining the frequency and angle information.

FIG. 3 is a block diagram that shows an example of components and the flow of information between components of the PLL 16 controller of FIG. 2 that is useful in obtaining the frequency and angle information. In order to place the SPC 10 in parallel operation with the grid 12, the phase angle $\theta_{spc}$, and frequency fspc of the SPC 10 should be synchronized with the phase angle $\theta\_grd$ and frequency $f_{grd}$ of the grid 12. PPLs are generally commercially available. The PPL 16 illustrated in FIG. 3 includes a phase detector Blk 13, a PI regulator Blk 11, an integrator Blk 12, and an oscillator Blk 14.

Referring to FIG. 2, grid phase angle and frequency detection is performed by using the PLL 16 mechanism that is shown in FIG. 3. The initial angle generator 18 in FIG. 2 is used to detect if the phase angle of the grid voltage $V_{a-g}$, $V_{b-g}$, $V_{c-g}$ is passing 360 degrees of a cycle at the current sampling time. Of course, a cycle is from 0 degrees to 360 degrees for a sinusoidal voltage waveform. If the grid voltage phase angle $\theta\_{grd}$ passes 360 degrees at this sampling step, the sampling step is called an initial sampling step, because the grid phase angle $\theta\_{grd}$ is already in a new cycle that is begun to count the phase angle from 0 degrees. At this initial step a flag signal Flg_cycle_initial in the initial angle generator 18 is set to be a first logic level "1", and the actual grid voltage phase angle is recorded as $\theta_0$ and defined as the initial phase angle.

Referring further to FIG. 2, a phase angle step increment generator 20 generates a step increment. The phase angle step increment generator 20 generates a $\Delta\theta\_cyc$ that is a phase angle increment of a grid voltage $V_{a-g}$, $V_{b-g}$, $V_{c-g}$ at a certain frequency that can be obtained by the following equation:

$$\Delta\theta\_{cyc} = 2\pi \cdot t_{step}/T_{grd} = 2\pi \cdot t_{step} \cdot f_{grd} \quad \text{(Equation 1)}$$

In the above equation, $T_{grd}$ is the time period of the grid 12 voltage cycle, $f_{grd}$ is the frequency of the grid voltage, $t_{step}$ is the time interval of a sampling time step, and $\Delta\theta\_cyc$ is the step increment of the grid 12 voltage phase angle. When flag Flg_cycle_initial is equal to "1", a new cycle of phase angle discrete integration in a synchronization angle generator 22, as shown in FIG. 2, is started. The initial phase angle $\theta_0$ generated from the initial angle generator 18 and the phase angle step increment $\theta\_cyc$ generated from the phase angle step increment generator 20 are used as the two inputs of the synchronization angle generator 22. The following equation shows the discrete integration algorithm in the synchronization angle generator 22:

$$\theta_{spc}(k) = \theta_0 + \theta(k-1) + \Delta\theta\_{cyc} \quad \text{(Equation 2)}$$

In this equation, $\theta_{spc}(k)$ is the phase angle of the SPC 10 output voltage at the current sampling step k, and $\theta_{spc}(k-1)$ is the phase angle of the SPC output voltage at sampling step k−1.

Figure 4:
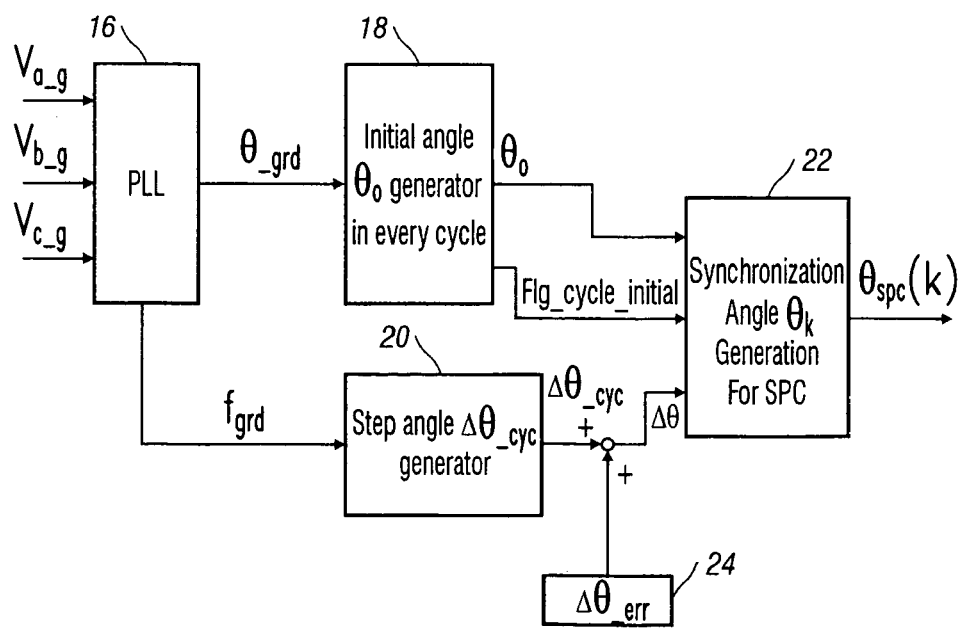
FIG. 4 is a block diagram that shows an example of components and the flow of information between the components for the phase angle error generator for islanding operation detection for an embodiment of the present devices and methods.

FIG. 4 is a block diagram that shows an example of components and the flow of information between the components for the phase angle error generator 24 for islanding operation detection. Referring to FIG. 4, in one embodiment the grid voltage $V_{a-g}$, $V_{b-g}$, $V_{c-g}$ is measured using the PLL 16, and angle information and frequency information is obtained from the PLL 16. The frequency is used directly without any filter to get at the cyclical angle. The output from the PLL 16 is the frequency in formation fgrd which is the input to the phase angle step increment generator 20. In the phase angle step increment generator 20, the frequency information fgrd is multiplied with the time step. The time step can be, for example, 100 microseconds or 200 microseconds, depending on the sampling rate, and is multiplied to get the angle step, $\Delta\theta\_cyc$. At the error generator 24, a small error is added to the angle step $\Delta\theta\_cyc$, which can be positive, negative or random value. The resulting $\Delta\theta$ is slightly different from the true grid updating step angle.

The $\Delta\theta$ is computed for every sample. At that step, the angle will not be exactly the same as the grid angle, but it will be slightly more or less, depending on the error. The $\Delta\theta$ goes to the synchronization angle generator 22 and is accumulated there. The phase angle is accumulated for a cycle. The synchronization angle continues to accumulate until the zero crossing of the voltage. Information for the grid 12 is in the PLL 16 because the angle of the grid voltages is also being generated. This is the actual angle, because the PLL 16 locks with the grid 12, and the angle of the grid voltages are actually known. In the PLL 16, when the change in voltage zero crossing is detected in every cycle, the angle $\theta_0$ is generated according to the grid angle. In the synchronization angle generator 22, the $\theta_0$, which is the true grid angle obtained from the PLL 16, is used to make the angle of the inverter of the SPC 10 equal to the $\theta_0$ in every cycle. Thus, any error which could have occurred due to the error $\Delta\theta\_err$ injection is corrected. The $\Delta\theta\_err$ injection is done at every sample, but the synchronization is done at every cycle, so the Flg_cycle_initial is generated every cycle. Whenever the grid voltage $V_{a-g}$, $V_{b-g}$, $V_{c-g}$ is crossing zero the flag is set. Thus, the flag is set only every cycle and the error is accumulated at every sample. At every cycle, the error is corrected and made equal to the grid angle at that point. In that way, the error does not have time to accumulate and propagate through other cycles. That is a basic aspect of an embodiment of the present devices and methods. In this aspect, if the grid 12 is disconnected, the angle $\theta_0$ will be equal to the inverter commanded angle, so it will not be corrected and will start to drift.

Referring again to FIG. 4, at the error generator 24 a pre-determined very small phase angle step increment error $\Delta\theta\_err$ is added to the angle step increment $\Delta\theta\_cyc$. The sum of $\Delta\theta\_err$ and $\Delta\theta\_cyc$ forms a new phase angle increment $\Delta\theta$ that is used in the synchronization angle generator 22 to generate the voltage phase angle of the SPC 10. The small step increment error $\theta\_err$ is an intentional error and is a preset value in design. This error $\theta\_err$ causes a phase angle error in each time step between the SPC 10 and the grid 12. The total phase angle error $\theta\_err$ between the SPC 10 and the grid 12 in a grid 12 voltage cycle is the difference between the sum $\Sigma\Delta\theta$ and the sum $\Sigma\Delta\theta\_cyc$ in a grid voltage cycle. The following equation shows the relationship of total phase angle error $\theta\_err$ and phase angle step increment error $\theta\_err$:

$$\theta\_{err} = \sum_{1}^{N} \Delta\theta - \sum_{1}^{N} \Delta\theta\_{cyc} = \sum_{1}^{N} \Delta\theta\_{err} \quad \text{(Equation 3)}$$

In the above equation, $\theta\_err$ is the phase angle error in a grid voltage cycle between the SPC 10 and the grid 12, N is the total integration steps in a grid voltage cycle used in the synchronization angle generator 22, $\Delta\theta$ is the phase angle step increment used in the discrete integration to generate the voltage phase angle for the SPC 10 in the synchronization angle generator 22, $\Delta\theta\_cyc$ is the phase angle increment of the grid voltage $V_{a-g}$, $V_{b-g}$, $V_{c-g}$ in an integration time step, and $\Delta\theta$ is the preset phase angle step increment error.

In order to keep the synchronization of the SPC 10 with the grid 12, the phase angle error θ_err for every voltage cycle between the SPC 10 and the grid 12 should be very small. Because the error Δθ is a preset value, it can be any desired small value. In the normal operation of the existing grid 12, the voltage phase angle $\theta_{spc}$ (k) of the SPC 10 at $k^{th}$ time step, generated from the synchronization angle generator 22 in FIG. 4, will follow the grid voltage phase angle with a phase angle shift equal to the error θ_err. However, by presetting a very small error step increment, the phase angle shift can be controlled to be very small. For example, if the error presets are a constant, Δθ_err=0.002° and N=100, are used in an application, then:

$$\theta_{err} = \sum_{1}^{100} \Delta\theta_{err}, = 0.2°$$

In this preset manner, the maximum phase shift of the SPC 10 with the grid 12 in a cycle will be 0.2°. The accumulation phase angle error in continuous operation will also not be greater than 0.2°, because the synchronization angle generator 22 upgrades its initial phase angle in every voltage cycle with the phase angle $\theta_0$ of the grid 12. No phase angle error will be transferred from one cycle to another cycle.

In a steady state operation with the existing grid 12, the frequency fspc of the SPC 10 is equal to the frequency of the grid 12 fgrd. This is true because the voltage cycle of the SPC 10 is controlled by the voltage cycle of the grid 12 through the grid voltage cycle initial signal Flg_cycle_initial. As is seen in FIG. 4, the flag Flg_cycle_initial is used to initiate the SPC's voltage phase angle discrete integration in the synchronization angle generator 22, cycle-by-cycle. This guarantees that the SPC 10 has the same frequency as the grid 12, so there is no frequency offset or frequency drift from the grid 12 frequency for the SPC 10.

In a condition of a loss of the grid 12 while the SPC 10 remains in operation, there will be voltage $V_{a\text{-}spc}$, $V_{b\text{-}spc}$, $V_{c\text{-}spc}$ on the local power lines 14. As shown in FIG. 4, the phase angle information $\theta_{grd}$ generated from the PLL 16 represents the voltage phase angle from the local power source SPC 10. In this case, the PLL 16 tracks the phase angle $\theta_{spc}$ (k) from the synchronization angle generator 22 of FIG. 4 and the frequency $f_{spc}$ generated from the SPC 10. The cyclic phase angle error mechanism of the device and method for SPC 10 application will cause an initial frequency shift from its original grid frequency. The following equations explain how and how much the frequency drifts in a cycle for the SPC 10 and the local power lines 14:

$\Delta f_{spc}(k)=(\theta\_err)/360*f\_spc(k-1)$ (Equation 4)

$f\_spc(k)=f\_spc(k-1)+\Delta f_{spc}(k)$ (Equation 5)

In the above equations, $\Delta f_{spc}$ (k) is the frequency drift at time step k, $f_{spc}$ (k) is the frequency generated from the synchronization angle generator 22 for the SPC 10 at time step k, f_spc (k-1) is the frequency generated from the synchronization angle generator 22 for the SPC 10 at time step k-1, the number 360 represents the phase angle of a cycle, and θ_err is the phase angle error in a voltage cycle that can be pre-set by using the formula:

$$\theta\_err = \sum_{1}^{N} \Delta\theta_{err}$$

The following example shows the drift principle according to equation 4 and equation 5. In the SPC 10, if a constant phase angle error Δθ_err=-0.002°, N=100, then θ_err=-0.2° are pre-set. Initial conditions before grid 12 loss can be defined as the grid voltage frequency $f_{spc}(0)$=60 Hz, and the frequency drift $f_{spc}$ (0)=0. After grid 12 loss the frequency drift versus time for the SPC 10 and the local power lines 14 can be estimated as, at a first cycle after grid 12 loss:

$\Delta f_{spc}(1)=(\theta\_err)/360*f\_spc(0)=-0.2/360*60=$
$-0.03333$ Hz.

$f\_spc(1)=f\_spc(0)+\Delta f_{spc}(1)=60-0.0333=59.9667$ (Hz);

at a second cycle after grid 12 loss:

$\Delta f_{spc}(2)=(\theta\_err)/360*f\_spc(1)=-0.2/360*59.9667≈$
$-0.03331$ Hz.

$f_{spc}(2)=59.9667-0.0333≈59.9333$ (Hz); and at the 3rd cycle after grid 12 loss:

$\Delta f(3)=(\theta\_err)/360*f(2)=-0.2/360*59.933=-0.03330$ Hz.

$f(3)=f\_spc(2)+\Delta f_{spc}(3)=59.9333-0.0333≈59.900$ (Hz).

at the 6th cycle after grid 12 loss:

$\Delta f(6)=(\theta\_err)/360*f(5)=-0.2/360*59.834=-0.03326$ Hz.

$f(6)=f\_spc(5)+\Delta f_{spc}(6)=59.8334-0.0333≈59.800$ (Hz).

at the 30th cycle after grid 12 loss:

$\Delta f(30)=(\theta\_err)/360*f(29)=-0.2/360*59.04=-0.0328$ Hz.

$f(30)=f\_spc(9)+\Delta f_{spc}(30)=59.04-0.0328≈59.00$ (Hz).

The frequency drifts from 60 Hz to 59.9 Hz takes about 3 cycles (0.05 seconds) and to 59 Hz takes about 30 cycles (0.5 Seconds). However, this drift time estimation is relatively correct when the load on the grid 12 has very low Q ($Q_C$ and $Q_L$). Here, Q represents the ratio of reactive power versus active power of the load on the grid 12, $Q_C$ represents capacitive reactive power, and $Q_L$ represents inductive reactive power. If the load on the grid 12 has a high Q, and $Q_C \approx Q_L$, the frequency drift that comes from the injected phase angle error may have a slower drift rate as the drift becomes bigger and the frequency drift may saturate before a desired frequency drift, for example 2 Hz, is reached. In order to overcome the possible canceling of initial frequency drift at a certain load condition, a particular random injected phase angle error can be used. The basic principle of the above teachings is not changed.

Referring to FIG. 5, an embodiment of the present devices and methods utilizes, for example, functionalities of an enable signal generator (ESG) 15 and an error frequency amplifier (EFA) 17. Two inputs to the ESG 15 are the measured grid frequency $f_{grd}$ from the PLL 16 and a clock signal. When the frequency change reaches to a certain level in a certain time, such as 0.1 Hz in 0.05 seconds or in 3 cycles, an output Ena from the ESG 15 is set to be "1" that enables the EFA 17. At normal operation, i.e., where the grid 12 is connected, the frequency error and frequency change during a time will be very small, and the enable signal Ena 19 will not be activated. When the grid 12 is lost, there will be a larger frequency change so that the enable signal of the ESG 15 will be activated. The injected phase angle error mechanism in an embodiment of the present devices and methods guarantees initial frequency change and frequency shift when ideal islanding conditions exist.

The EFA 17 is used to accelerate and enlarge the frequency drift when islanding occurs. Two inputs to the EFA 17 are measured grid 12 frequency $f_{grd}$ from the PLL 16 and Flg_cycle_initial from the initial angle $\theta_0$ generator 18. Flg_cycle_initial is used to mark and count elapsed cycles. For example, the following equation is a simplest embodiment of the EFA function:

$$\Delta f_q = G_{pos} * [f_{grd}(i) - f_{grd}(i-1)]$$

Here, the $\Delta fq$ is an additive of frequency change and $G_{pos}$ is the gain that is used to amplify the frequency error from cycle i−1 to cycle i. $G_{pos}$ is a positive value.

Referring to FIG. 5, the frequency additive $\Delta fq$ is added to the measured grid frequency $f_{grd}$ at an adder 21 to form a frequency $f_{grd}1$. Now, the frequency $f_{grd}1$ that has more shift is used to calculate the phase angle step increment, $\Delta\theta$_cyc. With the EFA 17 function and properly selected $G_{pos}$, the SPC 10 can have faster frequency drift and enough amount of frequency drift to provide islanding detection and protection.

Figure 6:
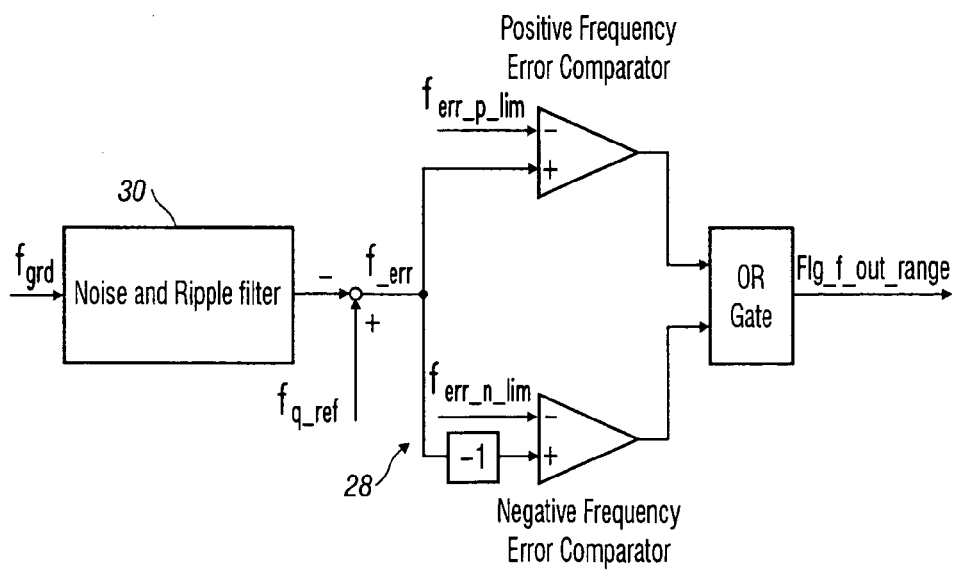
FIG. 6 is a block diagram that illustrates an example of the process of detecting the frequency out of the preset range.
Figure 7:
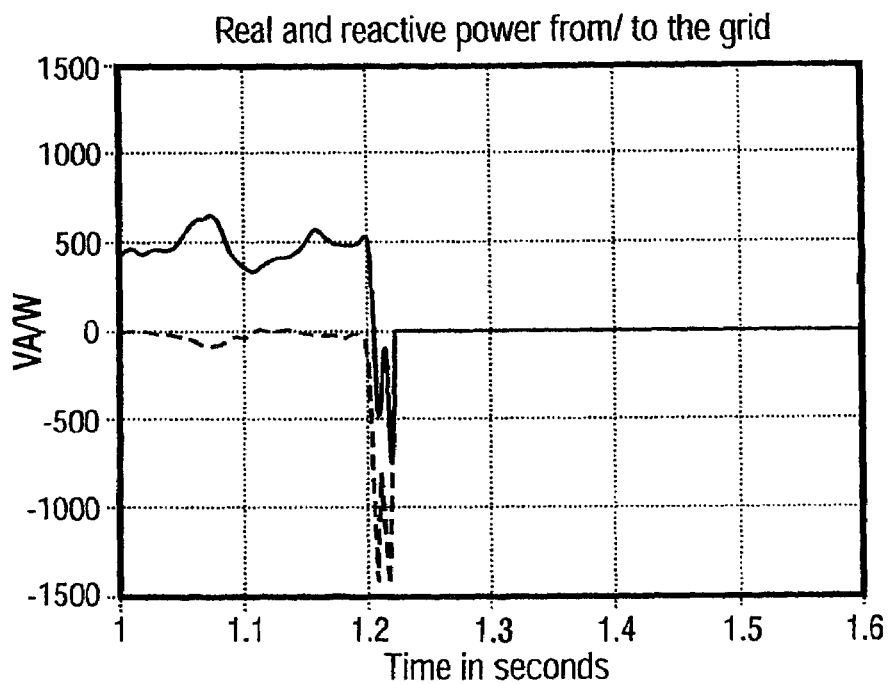
Figure 8:
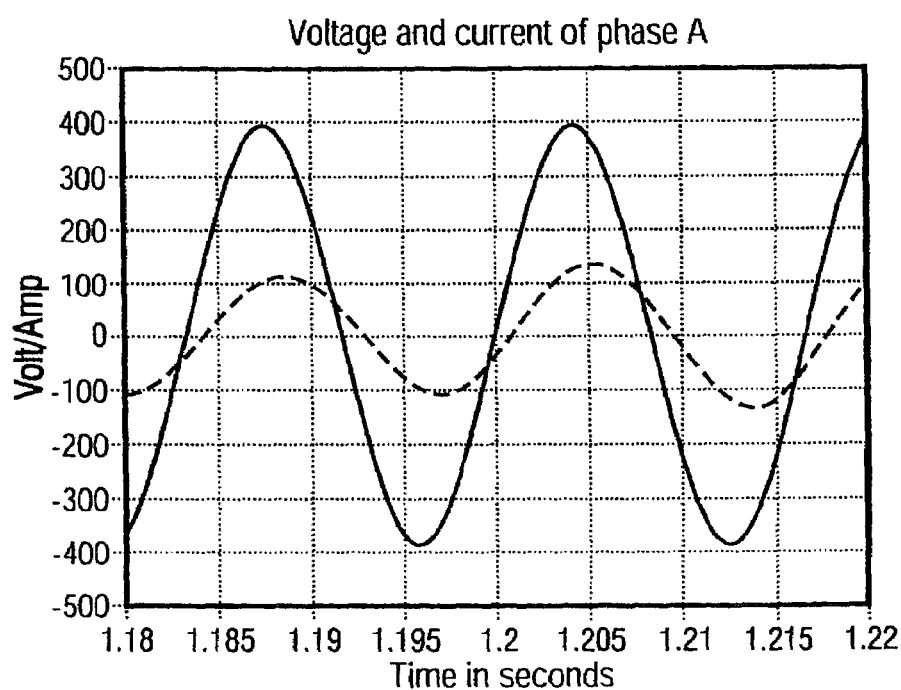
Figure 9:
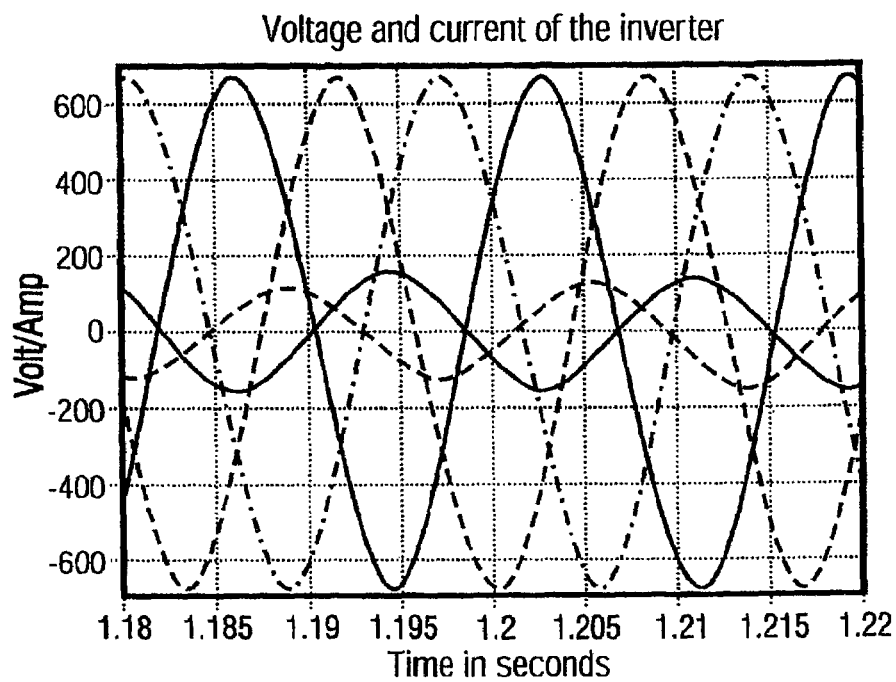
Figure 10:
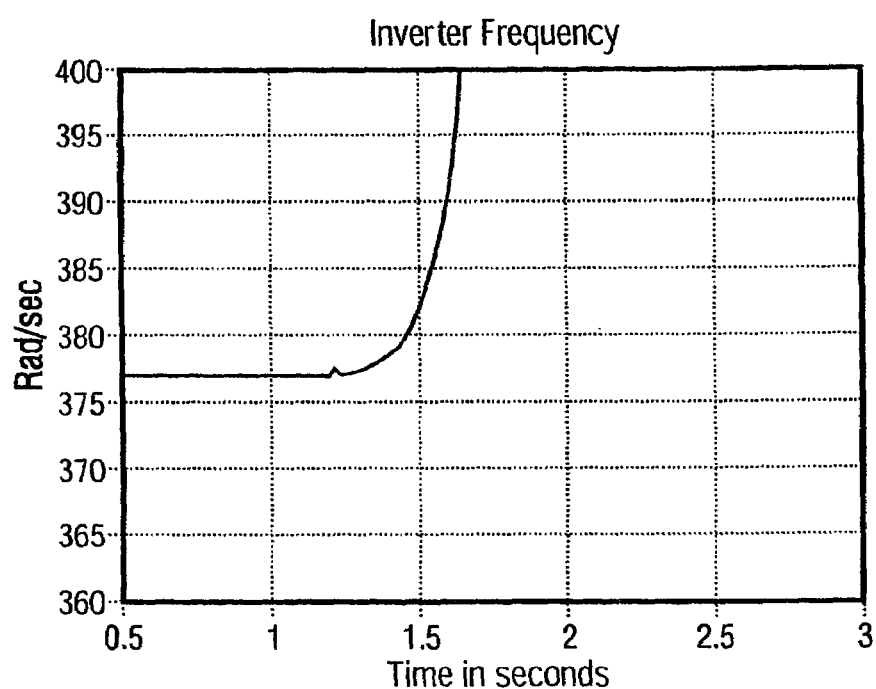
Figure 11:
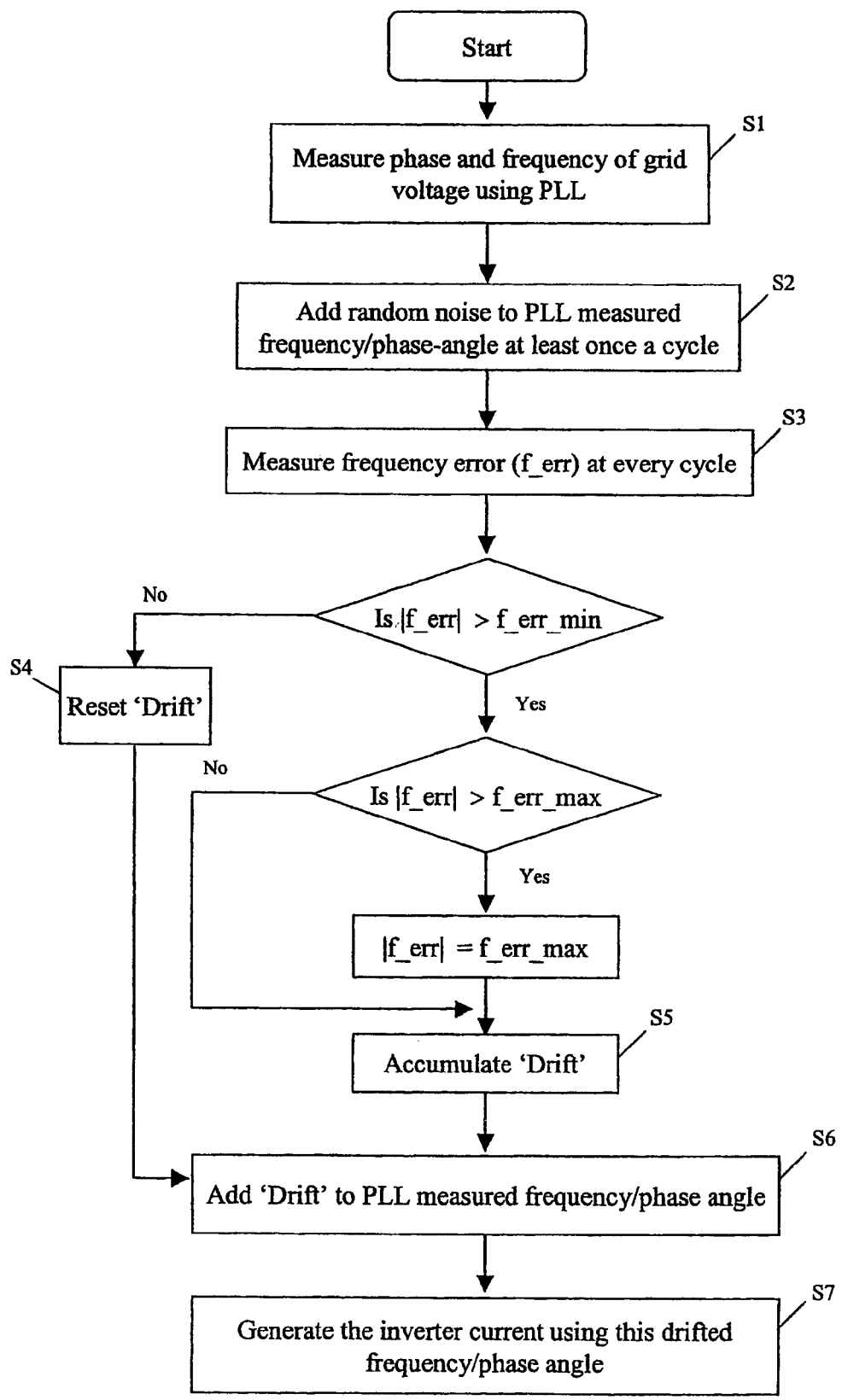

Referring once more to FIG. 5, a frequency fault detector 26 detects abnormal operation frequencies out of the preset operation frequency range. FIG. 6 is a block diagram which illustrates an example of the process of detecting the frequency out of the preset range. Referring to FIG. 6, the detected frequency $f_{grd}$ is filtered and subtracted from a reference frequency $fq\_{ref}$. The frequency error $f\_{err}$ resulting from the subtraction is compared with the preset positive frequency error limit $f_{err\_p\_lim}$, and negative frequency limit $f_{err\_n\_lim}$. If the magnitude of the frequency error f_err is greater than either the positive frequency error limit $f_{err\_p\_lim}$ or the negative frequency error limit $f_{err\_n\_lim}$, the error comparator 28 is set to be 1, and the flag signal Flg_f_out_range is set to be 1. This flag signal Flg_f_out_range can be used to trigger protection and isolation of the SPC 10 from the local power lines 14. For example, if the operation frequency range for the SPC 10 and the grid 12 is set at 59 Hz to 60.6 Hz (in FIG. 6, fq_ref=60 Hz, $f_{err\_p\_lim}$=0.6 Hz, $f_{err\_n\_lim}$=1.0 Hz), when the grid 12 loss occurs, the output frequency from the SPC 10 will drift below 59 Hz, and the Flg_f_out_range will be set. The grid frequency $f_{grd}$ is measured from PLL 16, but a filter 30 can be used to obtain its mean value. There is the reference at 60 Hz, and the error is tracked. Because of the drifting, the error will continue to accumulate and can be positive or negative. If it is negative, it is inverted with −1 and compared with the same limits. Therefore, it is set as a positive limit, so if the frequency is above 60.6 Hz the positive limit is exceeded, and if the frequency is below 59 Hz the negative limit is exceeded. A flag is then generated to trip the inverter unit of the SPC 10 and disconnect it from the grid 12.

All of the above U.S. patents, U.S. patent application publications, U.S. patent applications, foreign patents, foreign patent applications and non-patent publications referred to in this specification and/or listed in the Application Data Sheet, including but not limited to U.S. Provisional Application No. 60/319,077, filed Jan. 16, 2002, and entitled "DEVICE AND METHOD FOR DETECTING ISLANDING OPERATION OF A STATIC POWER SOURCE," are incorporated herein by reference, in their entirety.

Various preferred embodiments have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the present invention.

The invention claimed is:

1. An anti-islanding method of operating a static power source connected to a grid, comprising:
   in each voltage cycle, introducing a small phase angle error that is one of a positive value, a negative value, and a random value in a control of an output voltage of the static power source in each of a plurality of step intervals during the respective voltage cycle;
   detecting an accumulated frequency drift in the output voltage of the static power source away from a grid frequency that is caused in each voltage cycle of the static power source by the introduced small phase angle error upon a loss of the grid; and
   determining whether the detected accumulated frequency drift in the output voltage of the static power source exceeds a predefined level indicative of the loss of the grid.

2. The method according to claim 1, further comprising: amplifying the accumulated frequency drift before detecting the accumulated frequency drift in the output voltage of the static power source.

3. The method according to claim 1, further comprising: isolating the static power source from the grid if the detected accumulated frequency drift exceeds the predefined level indicative of the loss of the grid.

4. The method according to claim 2 wherein introducing a small phase angle error comprises injecting the small phase angle error in each voltage cycle without causing a harmonic effect.

5. The method according to claim 4 wherein the small phase angle error is accumulated at each step interval, and further comprising:
   correcting the accumulated small phase angle error in each voltage cycle.

6. The method according to claim 5 wherein correcting the accumulated small phase angle error in each voltage cycle comprises correcting the accumulated phase angle error in sunchronization with a voltage of the grid, if the grid is present.

7. The method according to claim 5 wherein accumulating the small phase angle error at each step interval in each voltage cycle comprises accumulating the small phase angle error having a value of substantially between plus and minus one degree in each voltage cycle.

8. The method according to claim 5 wherein accumulating the comprises accumulating the phase angle error at a synchronization angle generator at each step interval in each voltage cycle.

9. The method according to claim 4 wherein injecting the small phase angle error comprises generating a small phase angle step increment error having a predetermined value at an error generator for use in generating a voltage phase angle of the static power source by a synchronization angle generator.

10. The method according to claim 1 wherein detecting an accumulated frequency drift in the output voltage of the static power source comprises allowing the frequency to drift in an absence of the grid to force a correction of an accumulated phase angle error in each voltage cycle in synchronization with a voltage of the grid.

11. The method according to claim 10 wherein allowing the frequency to drift further comprises allowing the frequency to drift in a linear mode.

12. The method according to claim 10 wherein allowing the frequency to drift further comprises allowing the frequency to drift from cycle to cycle.

13. An anti-islanding device for operation of a static power source connected to a grid, comprising:
   means for introducing a small phase angle error that is one of a positive value, a negative value, and a random value in a control of an output voltage of the static power source in a plurality of step intervals during each voltage cycle;
   means for detecting an accumulated frequency drift in the output voltage of the static power source away from a grid frequency that is caused in each voltage cycle of the static power source by the introduced small phase angle error upon a loss of the grid; and
   an error frequency amplifier for accelerating and enlarging the frequency drift upon the loss of the grid.

14. The device according to claim 13, further comprising:
   means for isolating the static power source from the grid if the detected accumulation of frequency drift exceeds a predefined level indicative of the loss of the grid.

15. The device according to claim 13 wherein the means for introducing the small phase angle error further comprises means for injecting the small phase angle error in each voltage cycle without causing a harmonic effect.

16. The device according to claim 15, further comprising means for accumulating the small phase angle error at each step interval and correcting the accumulated small phase angle error in each voltage cycle.

17. The device according to claim 16 wherein the means for accumulating the small phase angle error further comprises a synchronization angle generator adapted for accumulating the small phase angle error at each step interval in each voltage cycle.

18. The device according to claim 16 wherein the means for correcting the accumulated small phase angle error in each voltage cycle further comprises means for correcting the accumulated small phase angle error in synchronization with a voltage of the grid, if the grid is present.

19. The device according to claim 16 wherein the means for accumulating the small phase angle error at each step interval in each voltage cycle further comprises means for accumulating the small phase angle error having a value substantially between plus and minus one degree in each voltage cycle.

20. The device according to claim 15 wherein the means for injecting the small phase angle error further comprises an error generator for generating a small phase angle step increment error having a predetermined value.

21. The device according to claim 20 wherein the means for injecting the small phase angle error without causing a harmonic effect further comprises a synchronization angle generator adapted for using the small phase angle step increment error in generating a voltage phase angle of the static power source.

22. An anti-islanding device to operate a static power source connected to a grid, comprising:
   a small phase angle error generator coupled to provide a small phase angle error in the form of one of a positive value, a negative value and a random value into an output voltage of the static power source;
   an enable signal generator responsive to a clock signal and a grid frequency to provide a first output signal when a magnitude of a frequency change exceeds a first defined value and a second output signal when the magnitude of the frequency change does not exceed the first defined value; and
   an error frequency amplifier coupled to amplify the first and the second output signals from the enable signal generator.

23. The anti-islanding device of claim 22 wherein the small phase angle error generator is coupled to provide the small phase angle error in a plurality of step intervals in each cycle of the output voltage of the static power source.

24. The anti-islanding device of claim 23, further comprising:
   a synchronization angle generator coupled to accumulate the small phase angle error at each of step interval in each cycle of the output voltage of the static power source.

* * * * *